3,159,971
RESILIENT NOZZLE MOUNT
Charles M. Moebius, Cincinnati, and Charles H. Barricklow, Jr., Willoughby, Ohio, assignors to Parker-Hannifin Corporation, Cleveland, Ohio, a corporation of Ohio
Filed Feb. 24, 1961, Ser. No. 91,520
2 Claims. (Cl. 60—39.74)

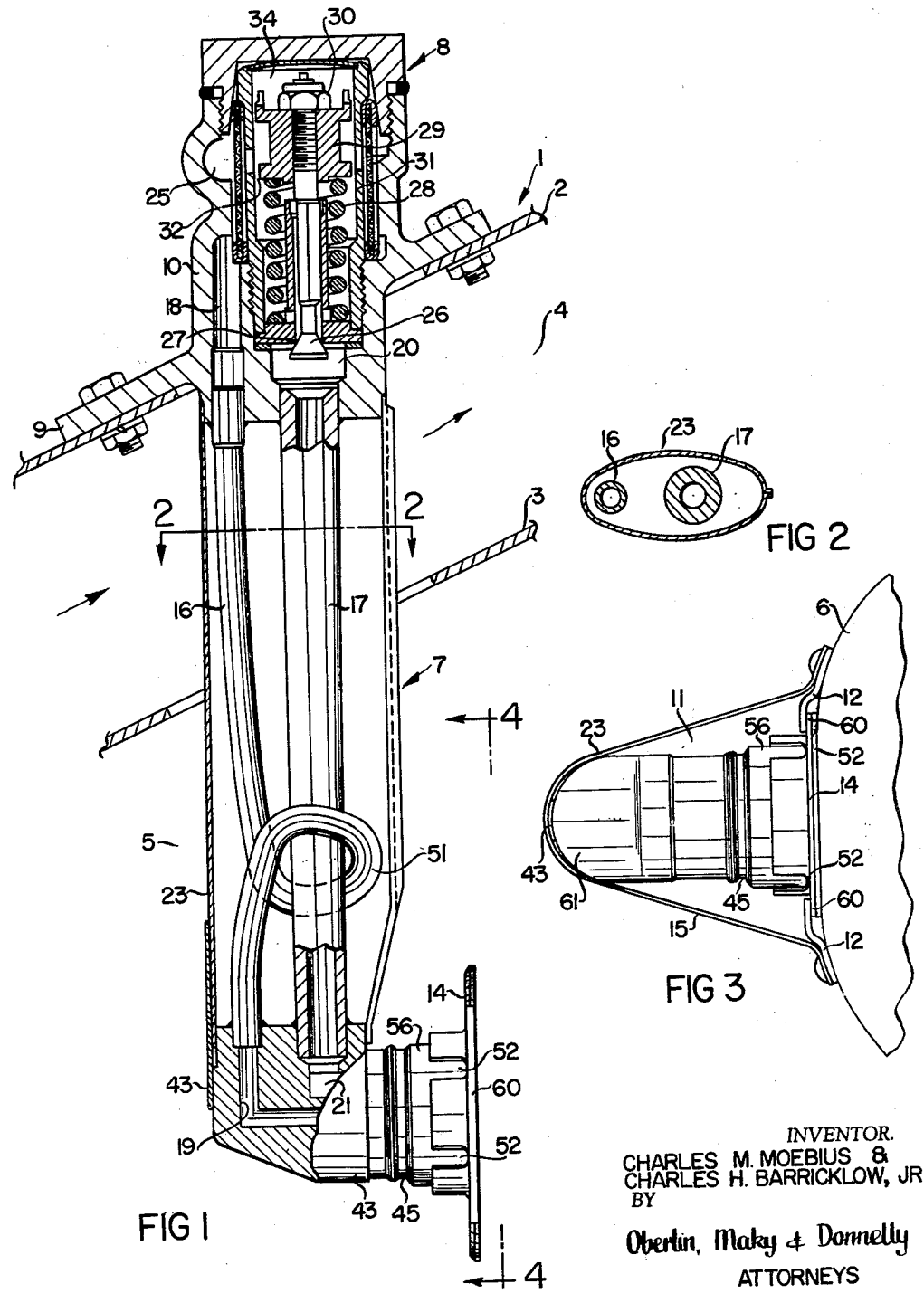

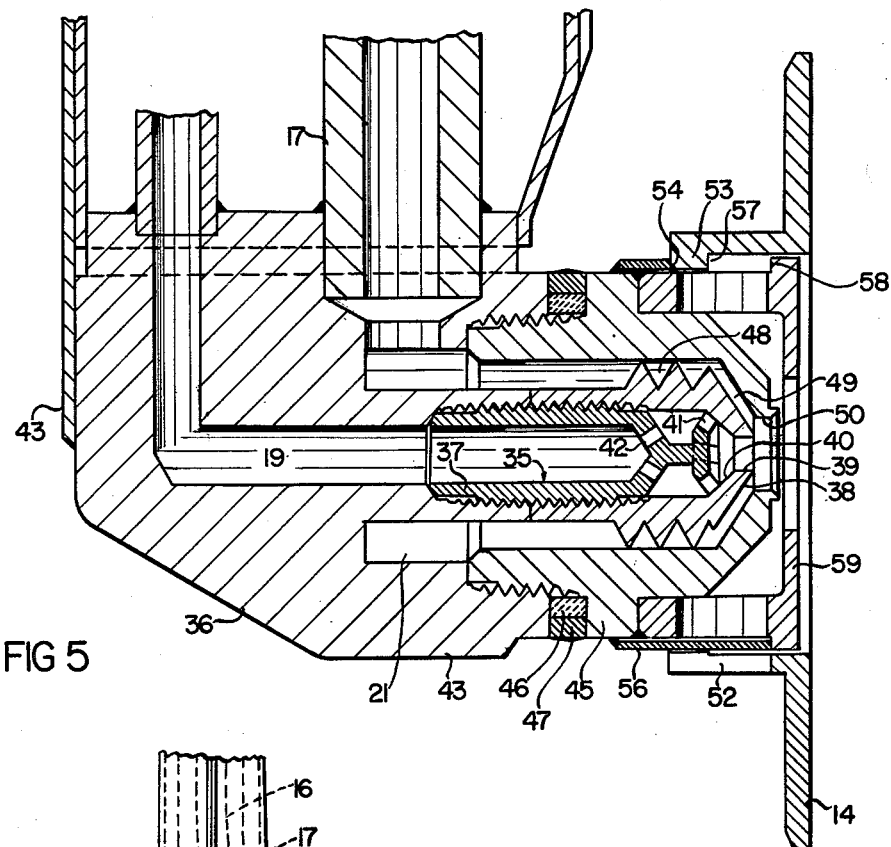
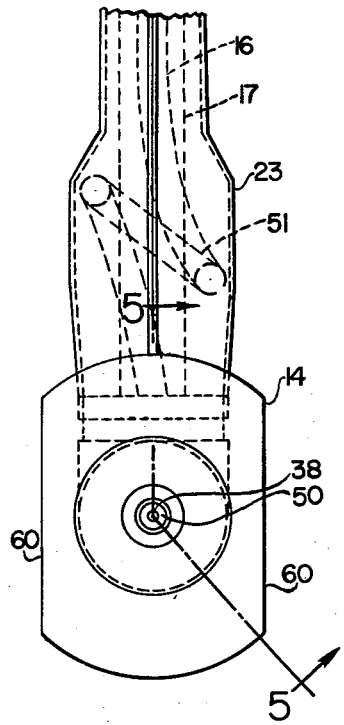
FIG 5
FIG 4
INVENTOR.
CHARLES M. MOEBIUS &
CHARLES H. BARRICKLOW, JR.
BY
Oberlin, Maky & Donnelly
ATTORNEYS

United States Patent Office 3,159,971
Patented Dec. 8, 1964

The present invention relates generally as indicated to a resilient nozzle mount and more particularly to such mount for a fuel injection nozzle employed in the flame tubes of gas turbines, jet engines, and the like.

In certain gas turbine installations, the fuel injection nozzles each have a pair of fuel supply pipes connected thereto that extend generally radially inward through the annular air intake passage of the turbine with the nozzles held as by clips and bands in position for discharge of fuel into the circular array of combustion chamber cups. The other ends of such pipes may be secured as to a flow divider when the nozzle is of the dual-orifice type. Owing to accumulation of tolerances of the turbine housing parts and nozzle parts, there are instances when the respective injection nozzles either have free play with respect to the combination chamber cups or are laterally shifted toward or away from the cups with consequent severe strains at the ends of the fuel supply pipes. In either event, the fuel supply pipes are apt to fail due to vibration and to the substantial bending moments at the constrained ends of said pipes where secured to the nozzle and to the flow divider.

Accordingly, it is a principal object of this invention to provide a novel resilient nozzle mount in which at least one of the pair of generally parallel fuel supply pipes, as for a dual-orifice nozzle, is quite flexible to effectively remove it as a factor in constraining the other pipe at its connection with the nozzle whereby such other pipe is deflected only in the manner of a cantilever beam with less stress than a beam constrained at both ends.

It is another object of this invention to provide a resilient nozzle mount having a fuel supply pipe that is tapered so as to approach the characteristics of a uniform strength beam to avoid stress concentration at the connection of such pipe to the flow divider.

It is another object of this invention to provide a novel nozzle assembly which is formed to take into account tolerance variations of the engine housing parts and nozzle assembly parts.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a fragmentary radial cross-section view of the flame tube of a gas turbine or jet engine, showing a resilient nozzle mount embodying the present invention;

FIG. 2 is a transverse cross-section view taken along the line 2—2, FIG. 1;

FIG. 3 is a bottom view as viewed upwardly in FIG. 1;

FIG. 4 is a fragmentary elevation view as viewed along the line 4—4, FIG. 1; and FIG. 5 is a much enlarged cross-section view of a dual-orifice fuel injection nozzle, such section having been taken substantially along the line 5—5, FIG. 4.

Referring now in detail to the drawings, the flame tube 1 of a gas turbine herein shown for purpose of illustration only, comprises coaxial tubular housing sections 2 and 3 which define therebetween an annular air intake passage 4 through which air for combustion flows as denoted by the arrows. Within the inner housing section 3 there is defined another air intake passage 5. Also, within the inner housing section 3 is a circular array of combustion chamber cups 6 into each of which fuel is adapted to be sprayed for combustion.

Associated with each combustion chamber cup 6 is a flow divider and nozzle assembly 7 which herein is shown as comprising a flow divider 8 of which the flange 9 of the body 10 thereof is bolted, welded, or otherwise secured to the housing section 2; and a fuel injection nozzle 11 which is guided into place in association with its combustion chamber cup 6 as by means of metal strips or clips 12 which fit over opposite sides of the flanged collar 14 on the nozzle 11, and a retaining band 15 of strip metal or the like, which embraces the end of the nozzle 11 remote from the cup engaging flange 14. 43 is a wear plate attached to the nozzle and contacted by the band 15 as shown in FIG. 3.

Interconnecting the flow divider 8 and the nozzle 11 are two fuel supply pipes 16 and 17 of which the pipe 16 communicates the primary passage 18 of the flow divider 8 with the primary passage 19 of the nozzle 11, and of which the other pipe 17 communicates the secondary flow divider pasage 20 with the secondary nozzle passage 21. Surrounding the pipes 16 and 17 is a sheet metal or like guard or housing 23 of generally elliptical or streamline form as best shown in FIG. 2, to provide minimum impediment to free flow of air through the annular air intake passage 4. Guard 23 is rigidly attached to the flow divider housing 10 but has a loose sliding fit at its lower end with the upper portion of nozzle body member 36. This loose fit accommodates slight relative movement between body 36 and body 10 due to differential thermal expansion and contraction, to vibration, or deflection of tubes 16, 17, without imposing destructive stresses on guard 23.

With reference to the flow divider 8, the same herein comprises the body or housing 10 aforesaid, which has a main fuel inlet port 25 which communicates with the primary passage 18 for flow of fuel through the pipe 16 to the primary pasage 19 of the nozzle 11. The secondary flow is controlled by the pintle type flow divider valve 26 which, at low fuel pressures, is held in engagement with the seat 27 by the spring 28. To vary the pressure at which the pintle valve 26 is unseated top ermit flow of fuel from the inlet port 25 to the secondary passage 20 there is screwed onto the stem of the pintle valve 26 a spring backup member 29 and a lock nut 30. It can be seen that when the fuel pressure is less than that required to unseat the pintle valve 26 fuel will flow only through the primary passage 18 and through the pipe 16 to the primary passage 19 of the nozzle 11. As will later be explained in detail, fuel will, at that time, be discharged only through a relatively small primary orifice in the nozzle 11 so as to achieve good atomization of the fuel at low flows and pressures. However, once the pressure of the fuel in the inlet port 25 acting on the area of seat 27 of valve 26 exceeds the seating pressure exerted by the spring 28 on the valve 26, flow will commence from the secondary passage 20 through the pipe 17 to the secondary passage 21 of the nozzle 11, whereby, as hereinafter explained, fuel will be sprayed into the combustion chamber through a secondary orifice in the nozzle 11.

The diameter of the spring backup member 29 may be proportioned with respect to the inside diameter of the flow divider sleeve 31 to provide a secondary annular restriction 32 which influences the rate of progressive increase in flow of fuel through the progressively increasing annular space between the pintle valve 26 and the seat 27 in such a way that the fuel flow vs. pressure curve may be modified to relatively flat form, i.e., a small increase in fuel pressure will result in a large increase in fuel flow, or even to the extent of producing a fuel flow vs. fuel pressure curve that has a hump therein, i.e., wherein after the pintle valve 26 has been unseated by prescribed pressure in relation to the area of the seat 27 and the spring pressure, the flow of fuel will increase while the inlet pressure decreases owing to the taking over of the opening function by the pressure drop between the upstream and downstream sides of the secondary restriction 32 acting on the much greater effective area of the member 29 as compared with the area of seat 27.

In addition, the adjustable member 29 has at its other end a relatively close fit in the bore of the flow divider sleeve 31 to form a dash pot or cushioning chamber 34 to prevent flutter of the pintle valve 26.

Referring now to the nozzle 11, it preferably comprises a welded assembly including a primary discharge orifice assembly 35 comprising a bushing 37 screwed into the main body part 36 having the primary passage 19 which communicates with the fuel supply pipe 16, the bushing 37 forming with said body part 36 a continuation of the primary passage 19, and a primary orifice member 38 which, in turn, is screwed onto said bushing 37 to provide the primary discharge orifice 39 and a spin chamber 40 leading to said primary orifice 39. The end of the bushing 37 fits into the primary orifice member 38 and has angularly disposed slots 41 which define with the surrounding bore of the primary orifice member 38 a plurality of diagonal or helical spin passages or spin slots from which the fuel enters the spin chamber 40 for whirling about in the latter before being discharged into the combustion chamber through the primary orifice 39. The bushing 37 is formed with openings 42 which communicate the primary passage 19 with the rear ends of the spin slots 41.

Surrounding the primary orifice assembly is a secondary orifice assembly which includes part 45 screwed and welded to body 36 as by the use of a ring 46 of refractory material such as carbon, disposed between axially spaced apart shoulders of the parts 36 and 45 and disposed within a ring 47 of weld metal through which the two parts 36 and 45 are welded together, the refractory ring 46 serving as a barrier to prevent entry of weld metal into the interengaged threads of these parts. Thus, if it is desired to disassemble the nozzle 11 for replacement of parts, or for servicing, all that it is necessary to do is to cut away the weld metal ring 47 down to the periphery of the refractory ring 46, whereby the parts 36 and 45 may be readily unscrewed.

The two parts 36 and 45 define the secondary passage 21 around member 38 to which the fuel supply pipe 17 leads. The primary orifice member 38, in addition to providing the primary discharge orifice 39 and primary spin chamber 40, is exteriorly formed with a helical groove 48 whereby fuel flowing through the secondary passage 21 will have whirling motion imparted in the spin chamber 49 defined by the conical wall of the part 45 and the conical end of the primary discharge member 38. The part 45 is also formed with a secondary discharge orifice 50 which is of much larger size than the primary discharge orifice 39 and, as well-known in the art, the spinning fuel emerging from both orifices 39 and 50 will be introduced into the combustion chamber in finely divided spray form for efficient combustion.

It has been found that in practice when a nozzle assembly 11 is mounted in the flame tube of a gas turbine or jet engine, as herein disclosed, there may be a substantial accumulation of tolerances, whereby there may be as much as .075" variation in the position of the right-hand face of the nozzle (as viewed in FIG. 5) and the opposed face of the cup 6. If the nozzle body 36–45 is drawn against the cup 6 by some means so as to take up such clearance, it is obvious that one end of tubes 16 and 17 will be deflected toward the cup and load the tubes with an initial stress. Also, the tubes are subject to additional stress due to vibration imparted to the nozzle that is, slight movement of nozzle body 36 relative to body 10, not only by vibration of the engine but also by aerodynamic buffeting as the air flows at high velocity through passage 4 and over the tubular housing 23 around the fuel supply pipes 16 and 17. Accordingly, it has been found that when the fuel supply pipes 16 and 17 are of conventional form, namely, extending generally radially and straight from the flow divider 8 to the nozzle 11, such vibration and initial deflection results in early failure of the pipes 16 and 17 since in that event the pipes 16 and 17 are in effect beams with both ends constrained. It has been found that such failures may be eliminated by forming a loop 51 in the fuel supply pipe 16 which renders that pipe substantially ineffective to constrain the nozzle connection between it and the other pipe 17 with the result that neither pipe 16 nor 17 will fail due to vibration as aforesaid except possible after 10,000,000 or more cycles. Another important contributing factor to indefinite life of the assembly 7 herein is the tapering of the fuel supply pipe 17 to approach the characteristics of a uniform strength beam, whereby vibration and initial deflection if any as aforesaid of the nozzle results in distribution of the stresses throughout the length of the supply pipe 17 to eliminate vibration failure at the junction of that pipe 17 with the flow divider housing 10.

In order to facilitate assembly of the present nozzle assembly despite tolerance variations and also to largely eliminate initial deflection of tubes 16 and 17 when fastening nozzle 11 to chamber cup 6, the flanged collar member 14 which has the opposite flanges over which the clips 12 are engaged has an axial lost-motion connection with the nozzle assembly 11. Thus, the collar member 14 is peripherally slotted as at 52 and has inturned portions 53 extending through corresponding slots 54 of a ring 56 welded, or otherwise secured, to the nozzle body part 45. As most clearly evident from FIG. 5, wherein the collar member 14 is shown at its extreme left position engaging the bottoms of the slots 54, it can be seen that the collar member 14 may shift to the right until the shoulders 57 of member 14 and 58 of shroud 59 are in engagement. Furthermore, the ends of the inturned portions 53 of the collar 14 engaged in the slots 54 of the ring 56 serve to retain the collar 14 against rotation so that its parallel flanges 60 will always be aligned with the clips 12 when the assembly 7 is slipped radially into place. Moreover, the rounded bottom 61 of the assembly 7 guides the strap 15 into embracing relation as shown in FIG. 3.

Accordingly, within the limits of the amount of axial play (0.100" for example) of the collar 14 on the nozzle assembly 11, initial assembly strains upon tubes 16 and 17 are avoided. Moreover, even if there should be some assembly strains upon the tubes due to shift of the assembly 11 beyond the limits of the lost motion connection, the provision of the looped fuel supply pipe 16 and the tapered supply pipe 17, preclude vibrations from causing premature fatigue failure as aforesaid.

Other modes of applying the principle of the invention may be employed, change being made as regards the details described, provided the features stated in any of the following claims, or the equivalent of such, be employed.

We therefore particularly point out and distinctly claim as our invention:

1. A resilient mounting for a fuel injection nozzle comprising a body adapted to be fixedly mounted on the housing section of a gas turbine; a pair of conduits each having one end secured to said body for flow of fuel through said body and conduits; and a nozzle to which the other ends of said conduits are secured; one of said conduits being substantially more flexible laterally and longitudinally with respect to itself than the other whereby vibration of said nozzle induces flexing of said other conduit in the manner of a cantilever beam effectively constrained only at said one end thereof; said one conduit having a loop between its ends to impart said greater flexibility thereto; said other conduit being tapered so as to constitute, in effect, a uniform strength beam when thus flexed by vibration of said nozzle.

2. The combination with a flame tube of a gas turbine of the type having an annular air intake passage and a combustion chamber therewithin into which liquid fuel is adapted to be injected in spray form for combustion, of a body secured to the outer wall of said passage; a fuel injection nozzle having detachable engagement with the wall of said combustion chamber; and a pair of conduits radially traversing said passage and having their opposite ends secured to said body and nozzle respectively for flow of fuel therethrough for discharge from said nozzle into said chamber; one of said conduits being substantially more flexible laterally and longitudinally with respect to itself than the other whereby vibration of said nozzle due to flame tube vibration and aerodynamic buffeting of air flow through said passage and around said conduits induces flexing of said other conduit in the manner of a cantilever beam effectively constrained only at the end thereof secured to said body; said one conduit having a loop between its ends to impart greater flexibility thereto; said other conduit being tapered so as to constitute, in effect, a uniform strength beam when thus flexed by vibration of said nozzle.

References Cited in the file of this patent

UNITED STATES PATENTS

| | | |
|---|---|---|
| 547,504 | Scott | Oct. 18, 1895 |
| 1,869,242 | Frame | July 26, 1932 |
| 2,241,293 | Campbell | May 6, 1941 |
| 2,548,904 | Neal | Apr. 17, 1951 |
| 2,658,340 | Cohen | Nov. 10, 1953 |
| 2,667,033 | Ashwood | Jan. 26, 1954 |
| 2,674,846 | Bloomer et al. | Apr. 13, 1954 |
| 2,776,654 | Johnston | Jan. 8, 1957 |
| 2,807,934 | Purvis | Oct. 1, 1957 |
| 2,944,388 | Bayer | July 12, 1960 |
| 3,032,990 | Rogers | May 8, 1962 |

FOREIGN PATENTS

| | | |
|---|---|---|
| 723,110 | Great Britain | Feb. 2, 1955 |